United States Patent [19]

Kitamura

[11] Patent Number: 4,955,770
[45] Date of Patent: Sep. 11, 1990

[54] BED FOR A MACHINE TOOL
[75] Inventor: Koichiro Kitamura, Toyama, Japan
[73] Assignee: Kitamura Machinery Co., Ltd., Takaoka, Japan
[21] Appl. No.: 415,405
[22] Filed: Sep. 29, 1989

Related U.S. Application Data
[63] Continuation of Ser. No. 239,171, Aug. 31, 1988, abandoned.

[51] Int. Cl.$^5$ .......................... B23C 9/00; B23Q 11/08
[52] U.S. Cl. ...................................... 409/137; 384/16; 408/67; 409/137
[58] Field of Search ............... 409/137, 134, 253, 254; 408/67; 51/268, 271; 384/15, 16, 624; 29/DIG. 101, DIG. 102, DIG. 94, DIG. 79

[56] References Cited
U.S. PATENT DOCUMENTS

| 1,466,811 | 9/1923 | Thacher | 409/137 |
| 1,870,413 | 8/1932 | Klausmeyer | 409/137 X |
| 1,912,622 | 6/1933 | Cone | 409/137 X |
| 1,917,831 | 7/1933 | Fairbairn | 409/137 |
| 2,253,846 | 8/1941 | Cornell | 384/15 |
| 3,511,129 | 5/1970 | Müller | 409/137 |
| 3,964,801 | 6/1976 | Steinmetz | 384/16 |

FOREIGN PATENT DOCUMENTS

| 167729 | 8/1985 | Japan | 409/137 |
| 2154914 | 9/1985 | United Kingdom | 409/137 |

*Primary Examiner*—William Briggs
*Attorney, Agent, or Firm*—Michael N. Meller

[57] ABSTRACT

A bed for machine tools which includes at least one hole of a structure such that chips or cutting oil fallen on the bed from a working stage is caused to fall into the hole. The bed is formed with an inclined surface of such inclination that chips or cutting oil fallen on the bed from the working stage of the machine tool is caused to gathered in a predetermined place on the bed. The inclined surface is sloping toward the hole formed in the bed.

5 Claims, 9 Drawing Sheets

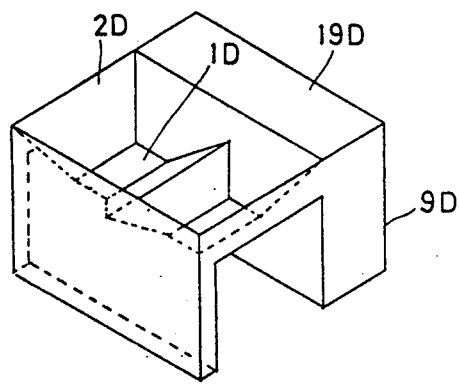
FIG. 4
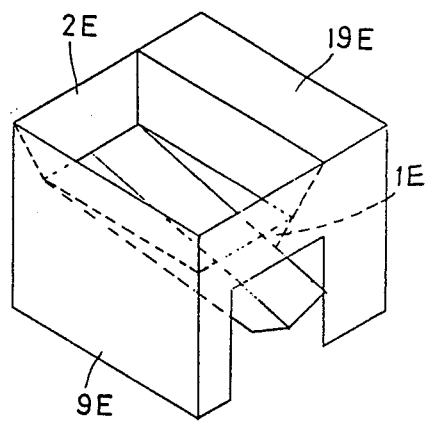
FIG. 5
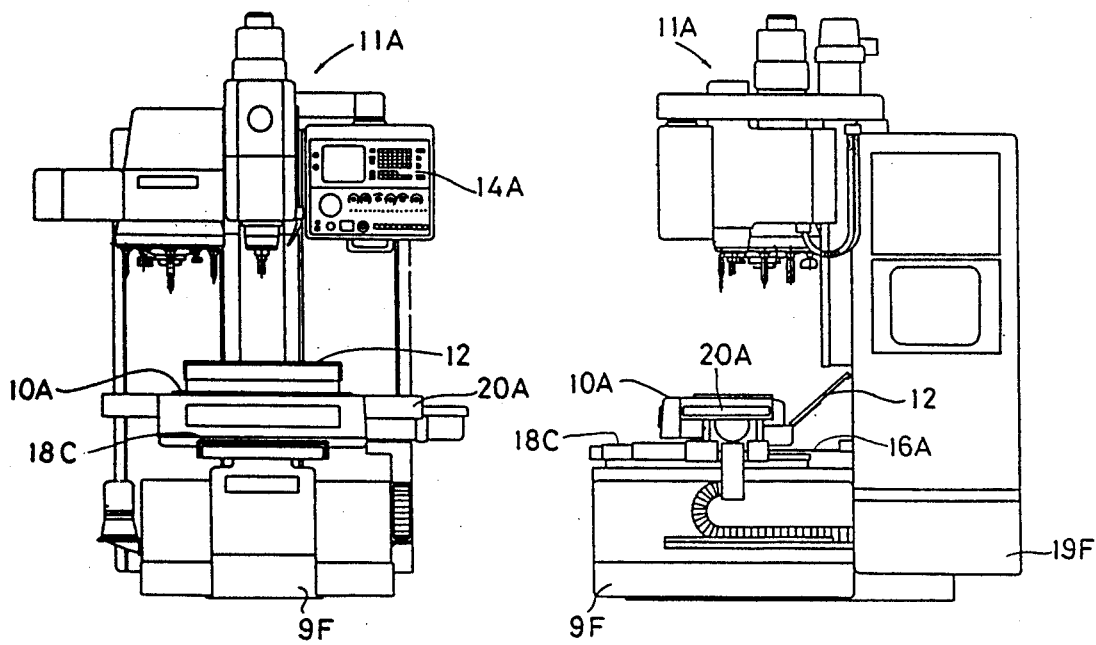
FIG. 6
FIG. 7

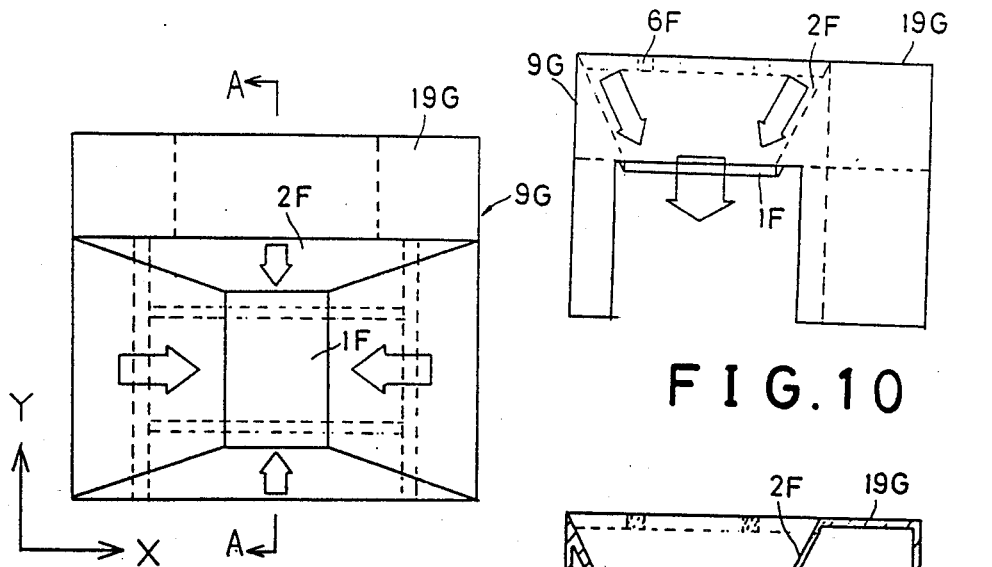
FIG. 10
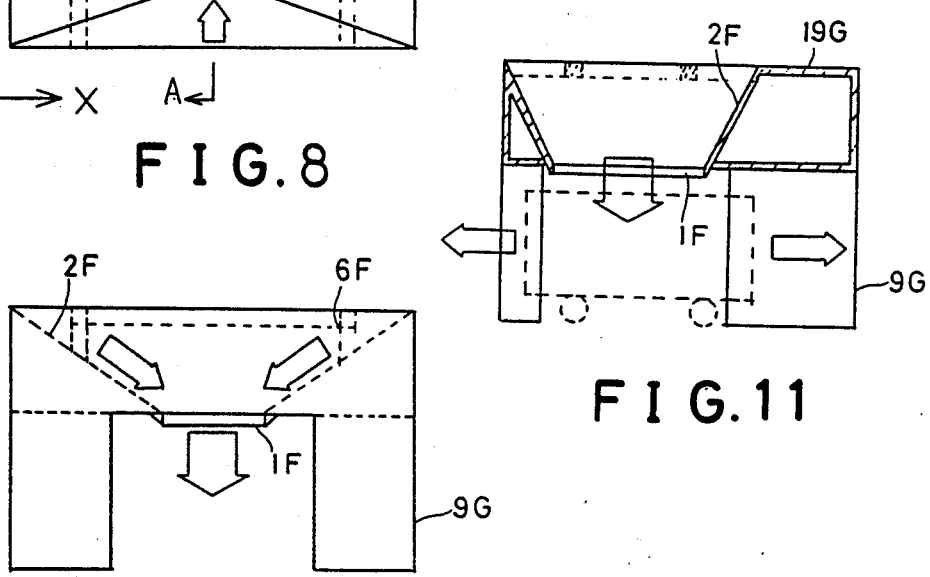
FIG. 8
FIG. 11
FIG. 9

FIG.13
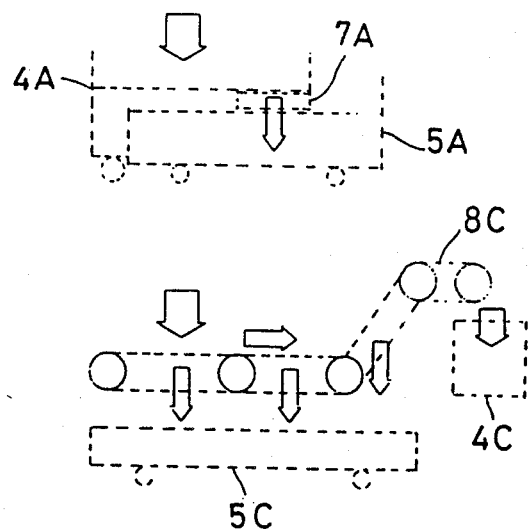
FIG.14
FIG.15
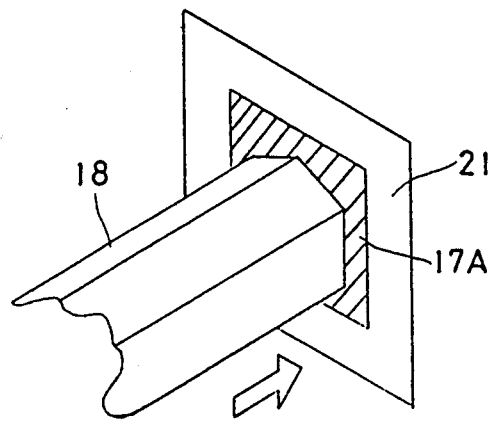

FIG.16
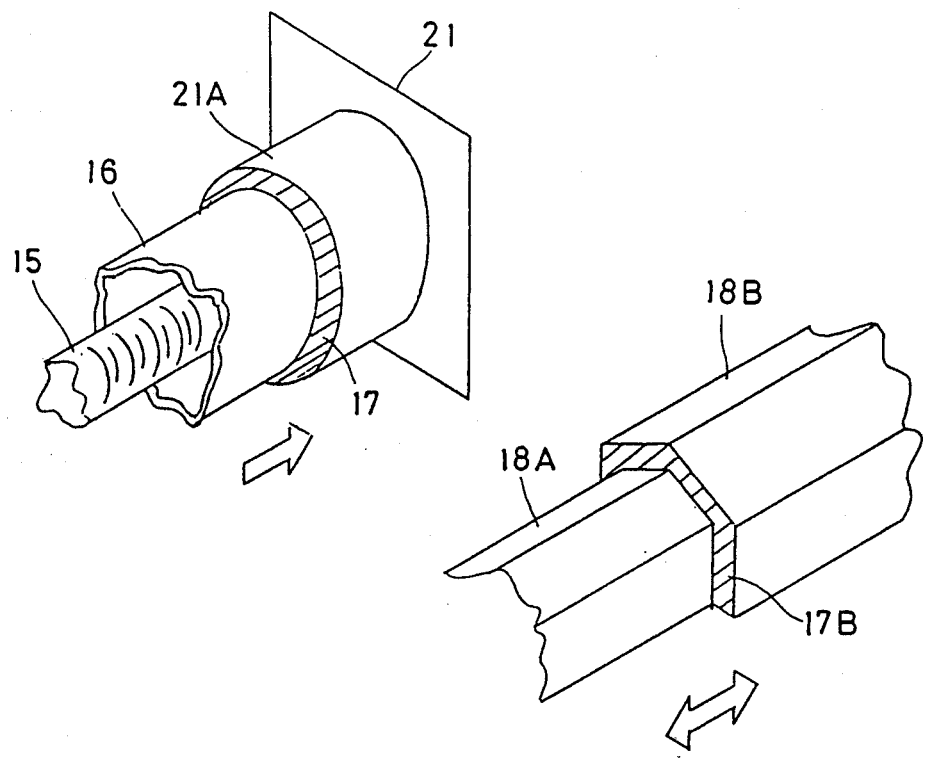
FIG.17
FIG.18
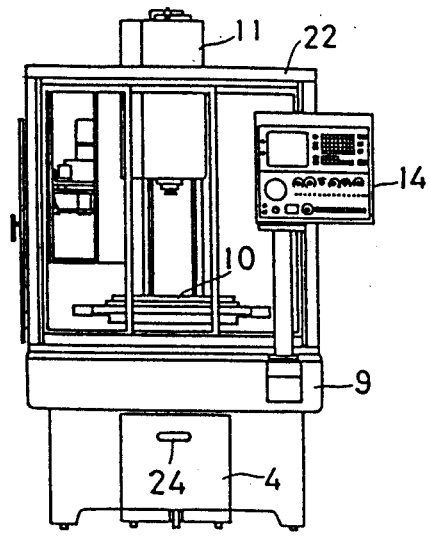

BED FOR A MACHINE TOOL

This application is a continuation of application Ser. No. 239171, filed Aug. 31, 1988, abandoned.

BACKGROUND OF THE INVENTION

1. Field of the Invention

The present invention relates to a bed for machine tools (particularly for metal working) and a construction for such machine tools.

2. Prior Art

The bed of a machine tool is a rigid base which supports substantially all the load of any of a variety of machine tools of relatively heavy weights when installed on the floor, and the bed includes a stage mounting frame (stage guide) and a base portion for supporting the column for the spindle and the center feed shaft of the machine tool.

In the machine tool, machine operations such as the cutting of a workpiece to be machined by a tool inserted into the spindle are performed and in such a case the positions of the working stage of the machine tool and the tool are moved to machine the workpiece into any of a variety of shapes.

Generally, cutting oil is used during the machining and the turnings or chips and the cutting oil are scattered in the vicinity of the machine tool.

If the chips and the oil are scattered so that they deposit on the stage guide and the center feed shaft which are positioned below the stage, the sliding movements of the stage guide and the center feed shaft are impeded, thus causing troubles.

SUMMARY OF THE INVENTION

It is an object of the present invention to ensure an easy disposal of chips cut during the machining operation of a machine tool, a cutting oil, etc., without scattering them to the surrounding area of the machine tool and thereby to prevent the occurrence of troubles in the machine tool due to the chips, etc.

To accomplish the above object, a machine tool according to the invention is designed so that chips and cutting oil are positively wiped off from its working stage onto its bed and the bed is formed with a hole or holes adapted to cause the chips and the cutting oil thrown out onto the bed to fall thereinto.

In accordance with another aspect of the invention, the top surface of the bed is composed of inclined surfaces having slopes such that the chips and the cutting oil thrown out onto the bed from the working stage of the machine tool are gathered.

In accordance with still another aspect of the invention, the top surface of the bed is composed of inclined surfaces sloping toward the hole.

In accordance with still another aspect of the invention, a device is provided below the bed to accumulate the chips and the cutting oil gathered or fallen into the hole.

In accordance with still another aspect of the invention, a device for separating the chips and the cutting oil is provided below the hole.

The machine tool according to the invention includes a feed shaft for moving the working stage on the bed relative to the bed, a stage movement guide for guiding the movement of the working stage, a cover for covering the upper surface of the stage movement guide and a wiper mounted on each of the feed shaft and the cover for scraping down the chips. In this case, the bed of the machine tool should preferably be formed by combining the beds according to the previously mentioned aspects.

As described hereinabove, the present invention is constructed in such a manner that the chips and the oil scraped down into the bed from the stage fall into the hole(s), so there is no danger of the chips depositing on the bed where they tend to cause troubles and the like.

As a result, the chips, etc., are positively thrown out onto the bed from the stage and the surrounding area of the machine tool is prevented from becoming filthy.

Also, since there is no danger of the chips, etc., being dropped on the floor in the vicinity of the machine tool, there is the effect of eliminating the labor for cleaning the floor and also preventing the operator from slipping accidentally due to the scattering of the cutting oil or the like.

In addition, it is only necessary to scrape the chips, etc., deposited on the working stage, etc., of the machine tool down onto the bed and therefore the cleaning of the chips, etc., is easy. In this case, the number of the previously mentioned holes may be one or more provided that the hole or holes are located near to the positions of the chips, etc., fallen from the stage.

It is to be noted that if the holes are small in diameter, the falling of large chips becomes difficult, whereas if their number is small, the chips, etc., tend to accumulate on the bed. On the other hand, if the holes are excessively large, problems remain to be solved from the standpoint of the strength for supporting the stage, etc.

Preferably, excluding the stage supporting guide top surface portions, the holes must be formed in suitable positions so that the chips, etc., do not accumulate on the top surface of the bed.

In accordance with a preferred aspect of the invention, the top surface of the bed is composed of inclined surfaces. As a result, when the chips, etc., thrown off the stage fall on the inclined surfaces of the bed, the chips flow downward, along with the cutting oil, toward the lower portions of the inclined surfaces and the chips, etc., are gathered in a given place on the bed in accordance with the inclinations of the inclined surfaces formed on the bed top surface. This makes it easy to discharge and dispose of the chips, etc., and also no chips, etc., gather on the bed near the working stage, which eliminates the tendency to cause troubles in the working stage sliding parts.

In accordance with still another preferred aspect of the invention, the top surface of the bed is composed of inclined surfaces such that the portion including the hole forms the lower parts of the inclinations. As a result, the chips, etc., fallen onto the bed from the stage are gathered up by flowing down, together with the cutting oil, along the inclined surfaces of the bed and then they are discharged through the hole to below the bed to accumulate in a collecting pan, thus requiring only the handling of the collecting pan for subsequent disposal and thereby making the cleaning, etc., very easy.

In accordance with another aspect of the invention, a device for collecting the gathered or wiped-off chips, etc., is provided below the hole. Thus, the chips, oil, etc., thrown out from the stage do not accumulate on the floor any longer and the troubles of cleaning the floor and the like are eliminated. Note that the simplest form of such a device for collecting the chips, oil, etc., is a box-type chip and oil collecting pan. In this case, if the chip and oil collecting pan is furnished with wheels and arranged below the hole or in a position just below the place of gathering, the chips, oil, etc., accumulate automatically in the chip and oil collecting pan so that after the machine work the chips and oil are transported, along with the chip and oil collecting pan, to the dumping place or the like and are disposed, thereby facilitating the disposal of the chips and the oil and eliminating the cleaning of the floor, etc.

On the other hand, a chip conveyor employing a belt conveyor may be used as the device for collecting the turnings or chips. In this case, the belt of the conveyor may be arranged in the same position as the chip and oil collecting pan so that the chips falling through the hole are received by the conveyor belt and conveyed to the outside of the machine tool, thereby collecting the chips and the oil in a chip and oil collecting pan provided ahead of the conveyor or conveying them directly to a dumping place or the like via the conveyor.

In accordance with still another preferred aspect, a device for separating the chips and the oil is provided below the hole. As a result, the chips and the cutting oil can be separately collected, thereby facilitating the subsequent disposal or reuse thereof. A net-like filter sieve or the like may, for example, be used as the device for separating the chips and the oil.

For example, if a hole is formed in the bottom surface of the chip collecting pan arranged below the hole of the bed or the place of gathering and a filter sieve net is arranged at the hole, only the oil is dropped downward through the net and the chips are left on the net. By arranging a separate oil collecting pan below such chip collecting pan, it is possible to selectively collect the cutting oil and the chips into the oil collecting pan and the chip collecting pan, respectively. Alternatively, it is only necessary to arrange the filter net so that it is directly attached to the hole of the bed and the oil collecting pan is arranged below the filter net. In this case, the chips are accumulated on the filter net.

On the other hand, if the belt of the conveyor is composed of a belt-like filter net, the oil drops below the conveyor through the belt-like net and the chips are directly conveyed on the conveyor belt. If an oil collecting pan is arranged below the conveyor and a chip collecting pan is arranged at the termination of the the conveyance, the oil and the chips are selectively collected automatically. In this case, if the conveyor is inclined so that the forward end of the conveyor is raised the filtration of the oil is improved.

The relative positions of the chip and oil collecting pans as well as the conveyor, etc., and their directions of movement need only be such that these positions present no inconvenience for the operation of the machine tool in question by the operator. Generally, it is preferable to arrange them in positions other than the working front or the operating side of the operator, such as, positions on the lower side, the lateral sides or the rear side of the bed.

Also, it is practical to form the hole or holes of the bed in positions which are near to the central portion of the bed to enhance the mechanical strength of the bed, the accumulation of chips, etc., and the operation of disposal.

In the machine tool according to the invention, a wiper is attached to both the feed shaft for relatively moving the working stage in the longitudinal direction of the bed and the cover mounted on the stage guide for guiding the movement of the stage so as to generally make a sliding constant with the associated member during its expanding and contracting movement and thereby to remove the chips deposited on the surface of the member.

This is a measure taken in consideration of the fact that in the machine tool of the invention the chips, etc., are positively thrown out onto the bed from the stage and therefore the chips, etc., tend to deposit and pile on the feed shaft and the stage guide cover which are arranged below the stage. In other words, if the feed shaft and the stage guide cover at the back of the stage are introduced with their surface deposits, e.g., the chips, etc., into the column during the backward movement of the stage, the chips enter the interior of the column, thus causing troubles. Also, if the chips, etc., deposited on the stage guide cover are allowed to stay there, the chips, etc., are entangled between the sliding portions of the associated telescopic covers and this also causes troubles.

Therefore, the wiper is provided at the sliding portions between the feed shaft and the column wall, between the associated covers and between the cover and the column wall so as to wipe off the chips by their mutual sliding movements.

The wipers are directly arranged on the feed shaft cover and the column wall positioned at the sliding portions so as to come into sliding contact with the outer surface of the feed shaft and the stage guide cover, respectively.

Since the center feed shaft and the stage guide cover are moved relative to the wipers along with the longitudinal movement of the working stage, the wipers wipe off the chips, etc., deposited on these members during the machining operation of the machine tool. Thus, it is possible to eliminate the need for a special cleaning operation of the parts in question and thereby solve the previously mentioned problems.

The wiper arranged on the column may be mounted directly on the column wall or alternatively, a cover may be extended from the column wall to cover the feed shaft, thereby, providing the wiper at their mutual sliding portions.

Further, both the feed shaft and the stage guide cover should preferably have an inclined or curved upper surface to facilitate wiping of the chips by the wiper.

Still, further, the wiper itself may be of a movable construction.

To further facilitate the understanding of the objects and effects of the invention, some preferred embodiments of the invention will now be described hereunder with reference to the drawings.

BRIEF DESCRIPTION OF THE DRAWINGS

FIGS. 1 to 5 are perspective views respectively showing schematically various forms of the bed of a machine tool according to the present invention, FIG. 6 is a front view of a prior art machine tool, FIG. 7 is a side view of the prior art machine tool, FIGS. 8 to 11 show a conceptual construction of a bed according to an embodiment of the invention with FIG. 8 showing a plan view, FIG. 9 a front view, FIG. 10 a side view, and FIG. 11 a sectional view taken along the section A—A of FIG. 8, FIGS. 13 and 14 are schematic diagrams showing other collecting devices, FIG. 15 is a schematic diagram showing an example of a wiper combined with a stage guide cover, FIG. 16 is a schematic diagram showing an example of a wiper combined with a feed shaft cover, FIG. 17 is a schematic diagram showing an example of a wiper used with telescopic slide guide covers, FIGS. 18 to 24 show a machining center constituting a specific embodiment of the invention with FIG. 18 showing a front view, 19 a back view, FIG. 20 a plan view, 21 a right side view, FIG. 22 a left side view, FIG. 23 a detailed partial longitudinal sectional view taken along the feed shaft, and FIG. 24 a detailed partial longitudinal sectional view taken along a direction perpendicular to the feed shaft.

DESCRIPTION OF THE PREFERRED EMBODIMENTS

In accordance with the conventional machine tool depicted in FIGS. 6 and 7, conventionally the cleaning of the top surface of a bed 9F on the back side of a stage 10A was not easy and therefore a splash guard plate 12 for chips, etc., was mounted on the stage back side.

On the other hand, a skirt 20A was provided in each lateral direction of the stage 10A and also a stage guide cover 18C was provided at the front, thereby forming a structure tending to make difficult the deposition of chips on the top surface of the bed 9F.

In this case, the chips were directly thrown down onto the floor surrounding the machine tool or the chips deposited on the stage 10A, the skirts 2A or the cover 18C were wiped off.

However, even if all the chips are thrown onto the floor surrounding the machine tool, it is difficult to clean the chips wetted with the cutting oil and it is also difficult to remove the chips deposited on the stage 10A, the skirts 20A or the cover 18C.

Particularly, where the oil is used in a large amount, if the oil is scattered on the upper surface of the machine tool and in its vicinity, this is undesirable not only from the working point of view but also from the standpoint of safety such as preventing an accidental slip by the operator.

Moreover, the amount of chips dropped onto the bed 9F was not trifling and these chips deposited on the top surface of the bed 9F, thereby requiring a cleaning operation whereby the chips are gathered in one place after the stoppage of the machine tool and then removed.

An embodiment of the invention will now be described.

The bed of a machine tool according to the invention may be shaped into any one of a variety of forms such as shown in FIGS. 1 to 5. More specifically machine tool beds 9A, 9B, 9C, 9D and 9E are rigid bases forming foundations for various machine tools of relatively heavy weights so that the stages of the machine tools are arranged on them and they are respectively provided in their rear parts with supports 19A, 19B, 19C, 19D and 19E for the columns equipped with the machining spindles of the machine tools.

In accordance with the invention, in the embodiments shown in FIGS. 1 to 5 the beds are respectively formed with holes 1A, 1B, 1C 1D and 1E of such constructions which permit the falling thereinto of the chips and the cutting oil thrown out onto the beds from the working stages of the machine tools.

Figure 3:
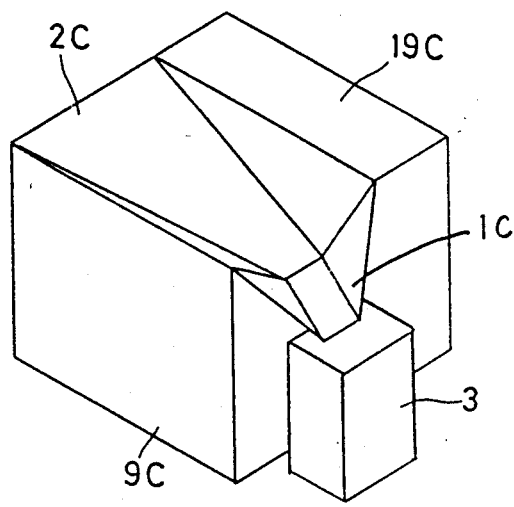

Also, in the embodiments of FIGS. 3 to 5, the top surfaces of the beds are composed of inclined surfaces 2C, 2D and 2E of such inclinations that the chips and the cutting oil thrown out onto the beds from the working stages of the machine tools are gathered at predetermined places. In this case, these inclined surfaces should preferably slope toward the holes.

The bed shown in FIG. 3 is provided with a collecting device (collecting pan) 3 for collecting the chips and the cutting oil which are gathered by the inclined surfaces 2C and dropped into the hole 1C.

As described hereinabove, the embodiments of the invention are each constructed so that the chips thrown out onto the bed from the stage fall, along with the cutting oil, to the lower part of the bed through the hole and thus the chips, etc., do not easily deposit on the bed.

Thus, it is possible to positively throw out the chips, etc., onto the bed, thereby preventing fouling of the surrounding area of the machine tool.

Also, the chips, etc., can be handled without causing them to fall onto the floor in the vicinity of the machine tool in machining operation and therefore the trouble of cleaning the floor and preventing the occurrence of accidents due to the oil, etc., is eliminated.

In addition, even with the chips, etc., deposited on the upper part of the stage, etc., of the machine tool, it is only necessary to wipe them off and onto the bed, thus making their cleaning easy.

Figure 1:
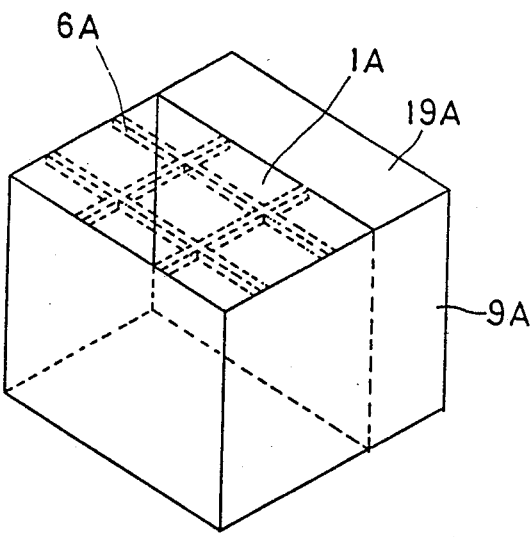
Figure 2:
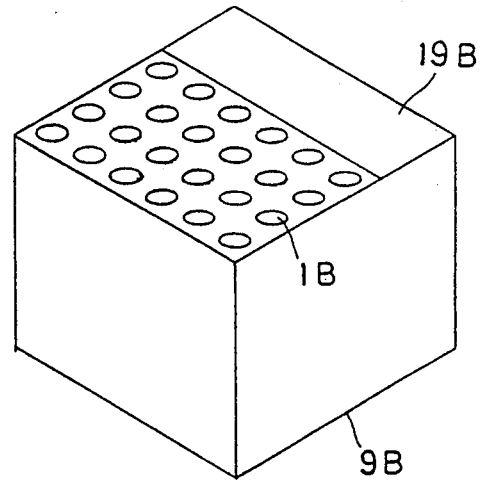

The number of holes may be one as shown in FIGS. 3 and 5 or two or more as shown in FIGS. 1, 2 and 4 provided that the holes are in the vicinity of where the chips, etc., are thrown out from the stage. It is to be noted that since the falling of large chips is not easy if the holes are small and also since the chips tend to accumulate on the bed if the number of the holes is small, the designing in these respects must be made properly. Also, excessively large holes tend to cause problems from the standpoint of the strength for supporting the stage, etc. For these reasons, as shown in Fig. 1, for example, it is desirable to form the holes 1A so as to avoid a stage guide 6A serving as stage supporting beams so far as the deposition of chips on the bed top surface is prevented.

In the cases shown in FIGS. 3 to 5, the top surfaces of the beds 9C, 9D and 9E are respectively composed of the inclined surfaces 2C, 2D and 2E. Thus, when the chips, etc., fall onto the inclined surfaces from the working stage (not shown) arranged on the top surface of the bed, the chips flow, along with the cutting oil, down to the lower part of the inclined surfaces and the chips are gathered at a given place in accordance with the inclinations of the inclined surfaces of the bed top surface.

As a result, discharge and disposal of the chips, etc., are facilitated and also the chips, etc., do not accumulate on the top surface of the bed, thereby avoiding troubles, etc., in the machine tool.

In the embodiments shown in FIGS. 3 to 5, the holes 1C, 1D and 1E are respectively arranged at the lower parts of the inclined surfaces 2C, 2D and 2E. Thus, the chips, etc., thrown out onto the bed from the stage are gathered up by the inclined surfaces to fall into the hole and thus the chips, etc., are naturally accumulated below the hole, thereby facilitating their subsequent collection, discharge and disposal. FIGS. 8 to 11 show an example of such case in which the flow paths of the chips, etc., are indicated by arrows.

Figure 12:
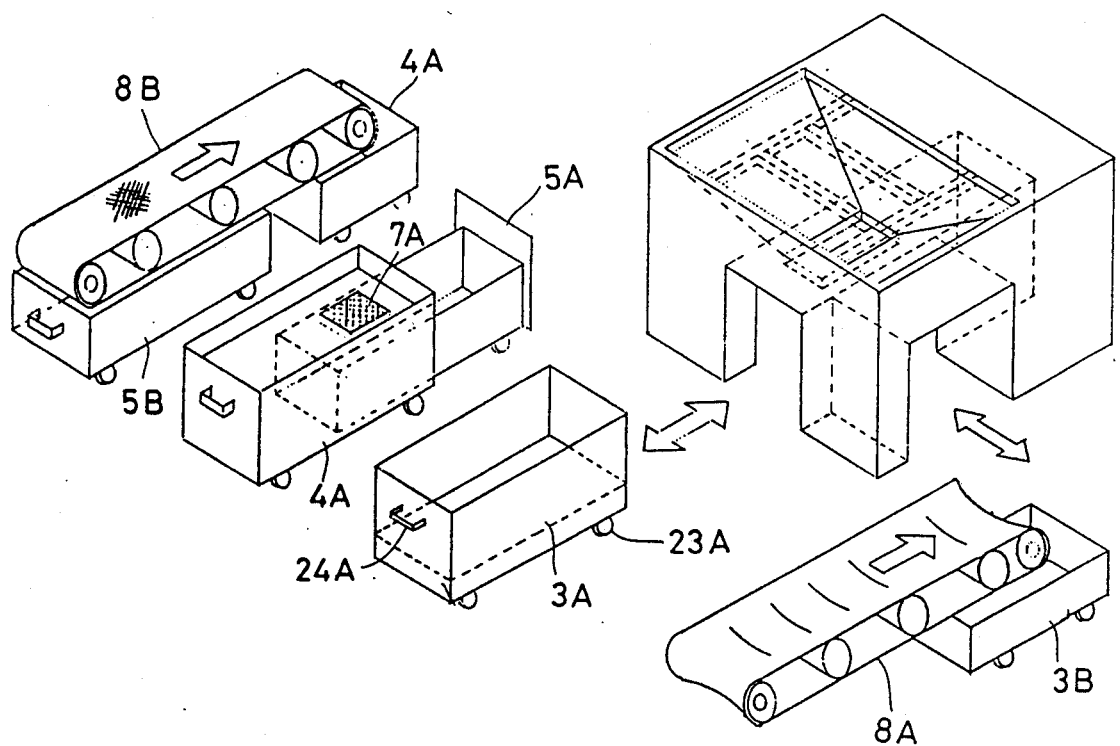
FIG. 12 is a schematic diagram showing a bed including a number of different forms of devices for collecting chips, etc.
Figure 19:
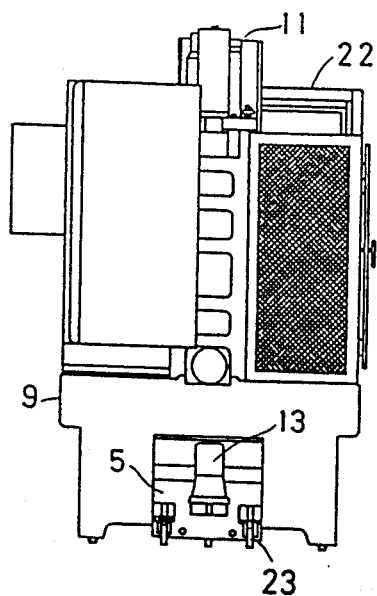
Figure 20:
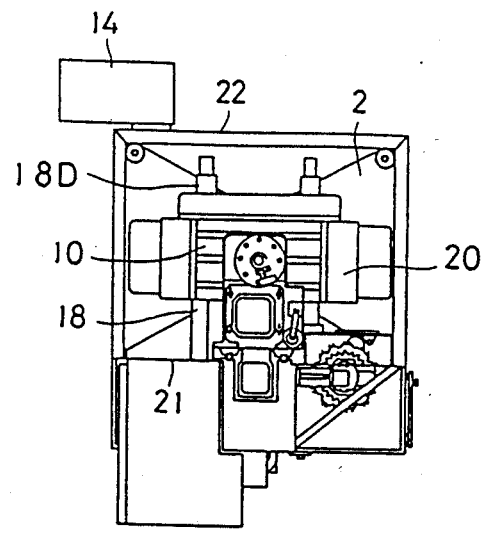
Figure 21:
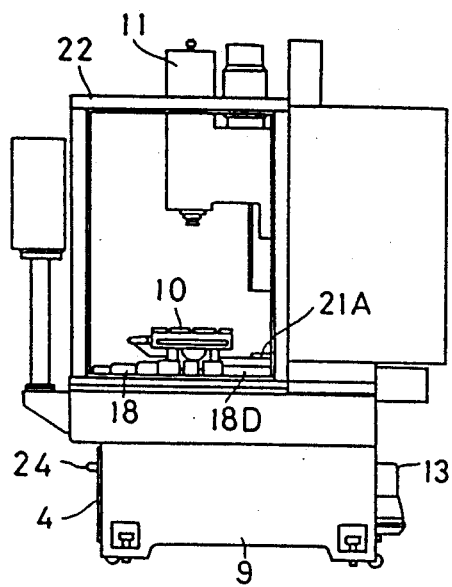
Figure 22:
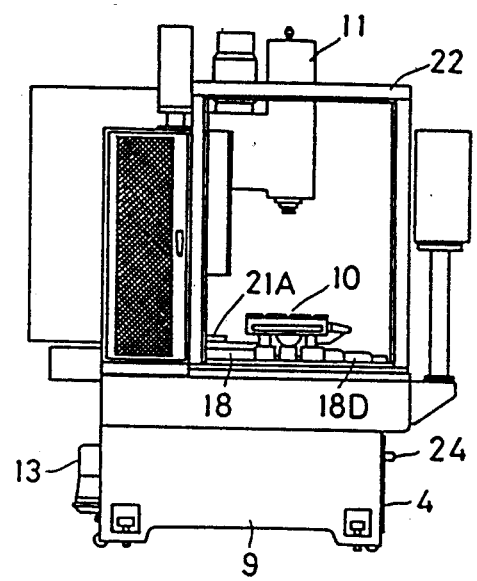
Figure 23:
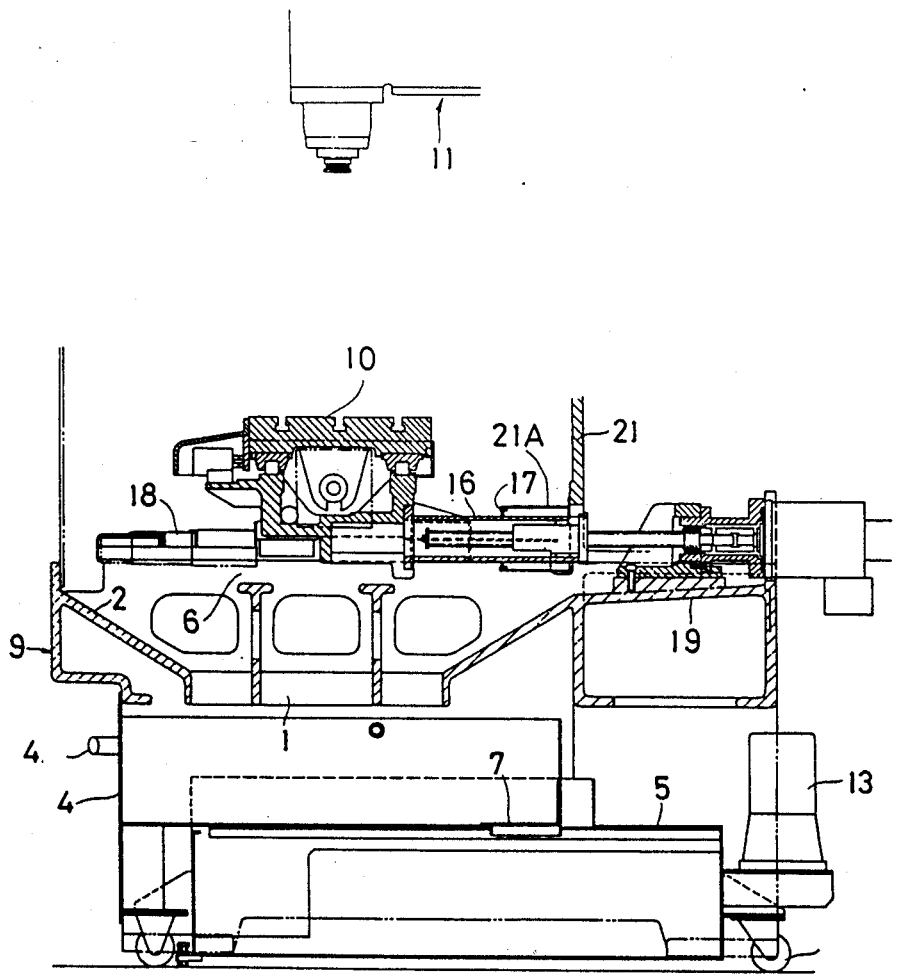
Figure 24:
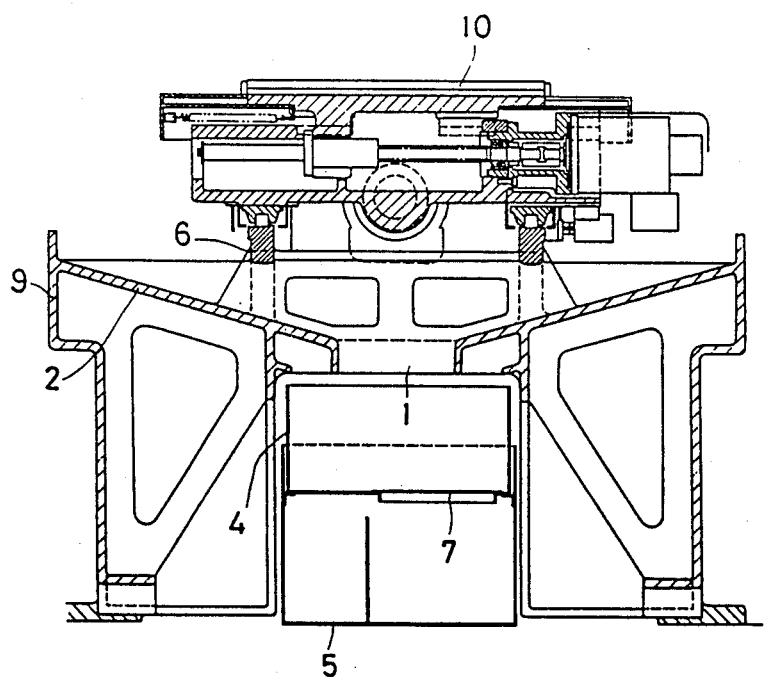

It is to be noted that the simplest example of the devices for collecting the chips, etc., at the outlet of the hole is the box-type chip and oil collecting pan 3. As shown in FIG. 12, if a chip and oil collecting pan 3A furnished with wheels 23A is used and arranged at the outlet of the hole or a position where the chips, etc., are gathered, the chips and the oil are naturally accumulated in the chip and oil collecting pan 3A so that after the machining the chips and oil collecting pan 3A filled with chips and oil can be transported to a dumping place or the like.

On the other hand, a belt conveyor 8A, 8B or 8C may be used as the device for collecting the chips, etc., as shown in FIGS. 12 and 14.

In other words, the belt section of the conveyor 8A may be arranged at the same position as the chip and oil collecting pan 3A so that the chips, etc., thrown out are conveyed from the place of falling by the conveyor 8A and are collected by a chip and oil collecting pan 3B provided ahead of the conveyor 8A or alternatively the chips and the oil are directly conveyed to a dumping place or the like by the conveyor and are collected.

In accordance with one aspect of the invention, a device for separating the chips and the oil from each other is provided in addition to the collecting device. The device for separating the chips and the cutting oil may be comprised, for example, of a net-like sieve 7A arranged below the hole as shown in FIGS. 12 and 13. In this case, if, for example, an opening is formed in the receiving surface of a wheeled chip collecting pan 4A arranged below the hole and the sieve net 7A is arranged in the opening, only the oil is dropped downward through the sieve net 7A and the chips remain in the pan 4A. If a separate wheeled oil collecting pan 5A is arranged just below the sieve 7A of the chip collecting pan 4A, the oil and the chips are separated and collected in the oil collecting pan 5A and the chip collecting pan 4A, respectively.

On the other hand, it is effective to use the conveyor 8B having its conveyor belt composed of a net-like endless belt so that the oil falls through the net-like belt into a pan 5B or 5C below the conveyor 8B and the chips are continuously conveyed and collected in a separate pan 4A. In this case, as shown in FIG. 14, the forward end of the conveyor 8B may be connected to an upwardly inclined conveyor 8C to facilitate drainage of the oil.

The arrangement of the chip collecting pan and the conveyor and their directions of movement can be determined simply with a view to causing no inconvenience to the operation of a machine tool to which the former are applied. Note that usually the pan and conveyor should preferably be arranged at positions other than at the front of the machine tool, e.g., below, the sides or the rear of the machine tool.

Also, the hole formed in the bed should preferably be positioned near the central portion of the bed top surface in consideration of the mechanical strength of the bed, the collection of chips, etc., and the subsequent discharge operation.

FIGS. 15 to 17 show ways in which a wiper 17 is attached to a feed shaft 15 for relatively moving the working stage of a machine tool in the longitudinal direction of the bed or a stage guide cover 18.

In accordance with the invention, the chips, etc., are positively thrown out onto the bed from the stage so that the chips, etc., tend to deposit on the feed shaft 15 and the stage guide cover 18 which are arranged below the stage.

In this case, with the feed shaft 15 on the back side of the stage and the cover 18 of the construction fastened to the stage, they are introduced into the column when the stage is moved backward. At this time, if the chips, etc., are deposited on these members, the chips are allowed to enter the sliding portions inside the column, thus causing troubles.

Also, if the chips deposited on the covers 18 are left as such, they are introduced between the sliding portions of the covers and troubles are also caused.

Thus, a wiper 17, 17A or 17B is provided at the sliding portions between the feed shaft and the column wall, between the covers or between the cover and the column frame.

In FIG. 15, the wiper 17A is attached to a column wall 21 so as to come into sliding contact with the outer surface of the stage guide cover 18. Also, in FIG. 16 the wiper 17 is arranged on a cover 21A positioned on the outer side of the sliding portions so as to come into sliding contact with the outer surface of a cover pipe 16 covering the feed shaft 15. Further, in FIG. 17 the wiper 17B is attached to an outer guide cover 18B so as to come into sliding contact with the outer surface of a telescopic inner guide cover 18A.

Since the cover pipe 16 and the covers 18, 18A and 18B are moved along with the longitudinal movement of the stage, the wipers 17, 17A and 17B respectively scrape off the chips, etc., deposited on the former during the machining operation of the machine tool.

The wiper arranged on the column wall 21 may be directly arranged on the wall 21 or in the alternative it may be attached to the cover 21A covering the cover pipe 16.

Also, both the cover pipe 16 and the cover 18 should preferably have an inclined or curved upper surface to facilitate the scraping by the wiper 17 or 17A.

Further, the wiper itself may be constructed so as to be movable.

A specific embodiment of the invention is shown in FIGS. 18 to 24.

In this embodiment, a hole 1 is formed at the center of the portion of a bed 9 forming its supporting part for a stage 10 and the bed top surface excluding a supporting part 19 for a spindle head 11, etc., is composed of inclined surfaces 2 sloping to the hole 1.

Since the plane projected area of the inclined surfaces 2 is greater than the movable ranges of the outer edges of the stage 10 and its skirts 18 and 20, the chips etc., falling from the upper part of the stage 10 strike against the inclined surfaces 2 and are thrown out along these surfaces to drop through the hole 1.

Stage guides 6 are arranged along the inclined surfaces 2 and they are positioned to not impede the falling of the chips, etc.

In the present embodiment, a splash guard 22 is arranged around the stage 10 and therefore the chips, etc., are prevented from scattering on the floor around the machine tool.

Arranged below the hole 1 are a chip collecting pan 4 having a sieve net 7 and an oil collecting pan 5 which are placed one upon another.

As a result, the chips, etc , dropped into the hole 1 are accumulated in the chip collecting pan 4 so that they are separated through the sieve net 7 and only the oil flows downward, thereby collecting the chips and the oil in the chip collecting pan 4 and the oil collecting pan 5, respectively.

These pans may respectively be replaced with the chip conveyor 8B, for example, as shown in FIG. 12.

The chip collecting pan 4 is provided with a handle 24 so that it can be pulled out.

The oil collecting pan 5 has wheels 23 and therefore it can be pulled out while carrying the chip collecting pan 4 thereon. The pan 5 is also furnished with an oil pump 13.

In the present embodiment, a feed shaft cover 16 has a cylindrical shape and a wiper 17 is provided on the inner side of the forward end of a column wall-side cover 21A fastened to a column wall 21 to come into sliding contact with the outer surface of the feed shaft cover 16.

In addition, a wiper 17A directly arranged on the column wall 21 is provided for a stage guide cover 18 and similarly the wiper 17A is in contact with the outer surface of the cover 18.

When the stage 10 is moved, these wipers wipe off the chips, etc., deposited on the associated parts and the chips are prevented from entering inside the sliding portions.

Further, in this embodiment left and right stage guide covers 18D are separately provided.

While, in the conventional machine tool, the left and right covers 18C are made integral with each other so as to prevent the falling of chips, etc., on the bed, in the present embodiment the chips, etc., are positively thrown down onto the bed 9 and therefore the left and right covers are made independently of each other.

I claim:

1. A machine tool comprising a feed shaft for moving a working stage on a bed of a machine tool relative to said bed, a stage movement guide for guiding the movement of said working stage, a cover means for covering an upper surface of said stage movement guide, a plurality of chip scraping wipers provided on said feed shaft and said cover, and means for collecting matter, wherein said bed has a first hole arranged above said collecting means and an inclined top surface for guiding matter which has fallen on said bed from said working stage toward said first hole, said stage movement guide comprises first and second guideways for supporting the upper surface of said working stage and guiding the movement of said working stage, said cover means comprises first and second stage guide covers for separately covering upper surfaces of said first and second guideways respectively, each of said first and second stage guide covers having an upper surface with an inclined portion, and said plurality of chip scraping wipers comprises first and second wipers for covering said first and second stage guide covers respectively and a third wiper for covering said feed shaft, whereby said first, second and third wipers wipe upper surfaces of said first and second stage guide covers and said feed shaft respectively through motion of said covers and said feed shaft relative to said bed.

2. The machine tool as defined in claim 1, wherein said matter comprises chips and cutting oil.

3. The machine tool as defined in claim 2, further comprising means for separating said chips and said cutting oil.

4. The machine tool as defined in claim 1, wherein said upper surfaces of said stage guide covers are straight.

5. The machine tool as defined in claim 1, wherein said upper surfaces of said stage guide covers are curved.

* * * * *